Dec. 26, 1944.  J. C. GRUBB  2,365,697
WELDED PRODUCT
Original Filed Jan. 8, 1941
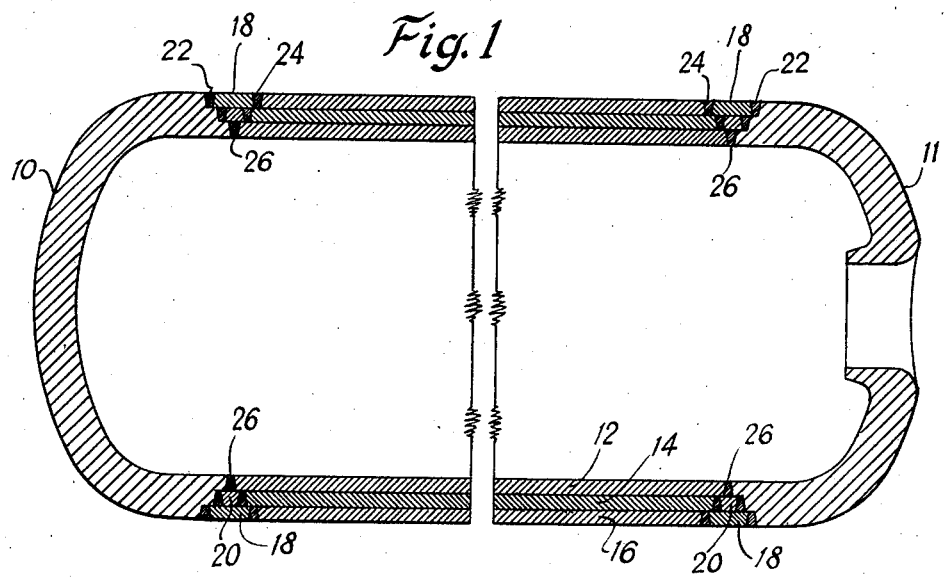
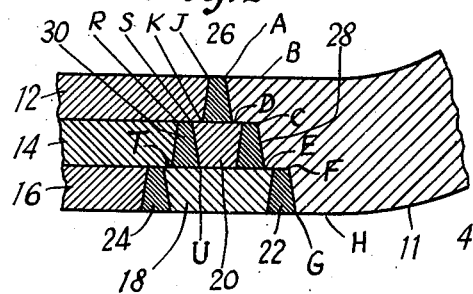 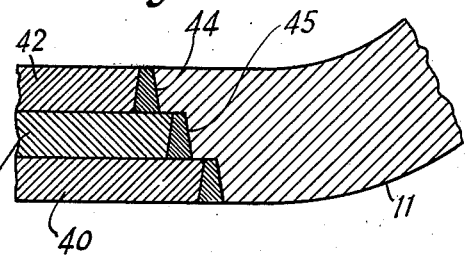
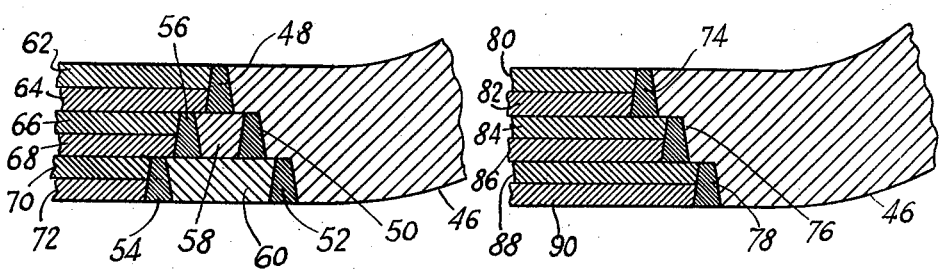
INVENTOR.
John C. Grubb
ATTORNEY Patented Dec. 26, 1944

2,365,697

UNITED STATES PATENT OFFICE 2,365,697

WELDED PRODUCT

John C. Grubb, Barberton, Ohio, assignor to The Babcock & Wilcox Company, Newark, N. J., a corporation of New Jersey Original application January 8, 1941, Serial No. 373,560. Divided and this application March 3, 1944, Serial No. 524,848. In Great Britain January 26, 1942

6 Claims. (Cl. 220—3)

This invention relates to pressure vessels.

In many industries there has been considerable demand for pressure vessels to be used in manufactures involving corrosive fluid and high temperature and pressure conditions. In many cases pressure vessels of large size are required.

To meet such requirements, and more particularly the high pressures involved, pressure vessels must have steel walls of considerable thickness, such thicknesses often being greater than five inches.

The forming of such thick steel plates to a pressure vessel contour involves costly and time consuming operations, and the welding together of such formed plates not only involves extensive deposits of weld metal, but such welds are, in many cases, so deep, or thick, that they are beyond the economic, if not the effective range of X-ray apparatus employed in the examination of welds.

To construct such thick walled pressure vessels entirely of corrosion-resistant metals such as stainless steel would involve prohibitive costs.

To overcome these difficulties, the present invention presents a pressure vessel of laminated construction, the main body, or the cylindrical portion of the vessel, comprising a plurality of contacting concentric shells. These shells are relatively thin and they are assembled tightly, one about another. Furthermore, the innermost shell may be of expensive and high quality corrosion-resistant metal such as stainless steel, while the tightly fitting outer shell or shells are of less costly steel, and are utilized to provide the pressure vessel with the proper hoop strength.

For high pressures the present invention contemplates a number of such concentric shells, constituting a pressure vessel body of considerable wall thickness. The illustrative pressure vessel heads are preferably unitary forgings of wall thicknesses of similar order. It is contemplated that these heads shall be welded to the ends of the laminated shell, and the invention involves an improved method of accomplishing such welding. It also provides a method of joining a plurality of laminae and a heavier plate.

According to prior art practices such welds would be formed by the deposition of weld metal in the deep circumferential grooves formed by the ends of the laminated shell and the circumferential portions of the heads, and owing to the depth of such grooves excessive deposits of weld metal would be required. This would not only excessively increase the cost of manufacture, but in laminated shell constructions, it would involve the danger of cracks originating at the plate separations, or at the juncture of the shell laminae and the welds.

An object of the present invention is to overcome such difficulties and to eliminate such undesirable characteristics or contingencies.

The invention will be described with reference to preferred embodiments thereof which are shown in the accompanying drawing.

In the drawing:

Fig. 1 is a longitudinal section through a pressure vessel constructed in accordance with the teachings of this invention.

Fig. 2 is a detail section showing an illustrative junction of the pressure vessel head and the laminated shell.

Fig. 3 is a detail view of the type of Fig. 2, but illustrating another embodiment; and Figs. 4 and 5 are sectional views illustrating other modifications in which the laminae of a pressure vessel shell are united with pressure vessel heads.

The heads 10 and 11 of the illustrative pressure vessel are preferably unitary steel bodies forged to the confirmation shown. After forging, the ring faces of the heads are machined so as to give them the stepped construction illustrated. This construction may be considered as involving a plurality of weld annuli, or annular formations such as those indicated by A—B—C—D, C—E—F, and F—G—H, in Figs. 2 and 3, similar formations also being involved in the embodiments shown in Figs. 4 and 5.

In the construction shown the corrosion-resistant shell, or inner lamina of the entire shell is of an inside diameter corresponding with the inside diameter of the annular formation A—B—C—D of the pressure vessel heads. This shell is constructed by the bending of a plate to a hollow cylindrical form and then welding together its confronting edges. Thereafter, it is aligned with the pressure vessel heads 10 and 11 arranged relative thereto to form such weld grooves as that indicated at A—D—J—K in Figs. 2 and 3.

The next step in the illustrative method is deposition of the weld metal 26 in the weld groove A—D—J—K. This may be accomplished by fusion welding involving the deposition of weld metal under the protection of a flux, and the illustrative method has the advantage that this initial weld is well within the effective range of X-ray equipment utilized for weld examination. Such equipment may be employed after the weld metal 26 is deposited, and after any adhering flux covering is removed.

In Fig. 2, the external surface of the weld 26 is aligned with circumferential surface D—C of the stepped construction of the head 10.

After the weld 26 is completed and examined, and its exterior surface is treated in the manner described, the filler ring 20, preferably of tapered cross-section as shown, is tightly fitted over the weld 26 so as to completely separate that weld from successive and separately formed welds. One of the latter, the weld 28 is then made in the same manner as the weld 26, the filler ring 20 being thus joined to the head annulus C—E—F.

The next step in the illustrative method is to form the steel shell or lamina 14 tightly around the inner shell or lamina 12. The shell 14 is preferably formed in a manner similar to the manner in which shell 12 was formed, but the former is shorter as indicated in Figs. 1 and 2, and its end is spaced from the filler ring 20 so as to present the weld groove R—S—T—U. Welds 30 and 31, similar to the previously formed weld 26 are then formed, and the shell 14 thus is effectively united with the head 11.

The Figs. 1 and 2 of the drawing show a third lamina or shell 16 in stepped relation to the inner-lamina or shell 14 and united with the heads 10 and 11 in a manner similar to that by which the shell 14 is joined to those heads. The filler ring 18 is first placed so as to cover and extend beyond the ring 20 and its joining welds 28 and 30. Thereafter the weld 22 is formed, joining the head 10 with the filler ring, and then the latter is joined with the shell 16 by the formation of the weld 24.

In the manufacture of the particular pressure vessel structure illustrated in Figs. 1 and 2 of the drawing the entire shell construction may be made up as a separate body before either one of its component shells are joined to the heads 10 and 11, but in the embodiment illustrated in Fig. 3 of the drawing the different shells or laminae 40—42 must be successively formed. In other words, the inner-shell 42 is formed and united with the head 11 by the weld 44 and then the succeeding shell 41 is formed around the inner-shell with its end extending over the weld 44 so as to separate the subsequently formed weld 45 from the weld 44.

In the embodiments indicated in Figs. 4 and 5 of the drawing, a greater number of thinner shell laminae are involved, and each annular weld portion of the stepped part of the head is joined with a plurality of the laminae. Referring to Fig. 4, the inner sub-shell or cylindrical lamina 62 is first united with the head 46 by the deposition of weld metal which may constitute part of the weld 48, the remainder of this weld subsequently joining the lamina 64 to the same weld annulus of the head. Thereafter, the filler ring 58 is fitted over the top surface of the weld 48 and united with the next outer weld annulus of the drum 46 by weld 50. Then the shell laminae 66 and 68 are successfully welded to the filler ring 58, these laminae being shown as secured to this filler ring by the weld 56.

The structure indicated in Fig. 4 is completed by the positioning of the filler ring 60 over the welds 50 and 56 and the filler ring 58, the formation of the weld 52, and the successive welding of the shell laminae 70 and 72 to the filler ring 60.

In the embodiment of the invention illustrated in Fig. 5 of the drawing, the separately formed welds 74, 76 and 78 each unite a plurality of shell laminae directly with the weld 46. Each of these welds may be formed in successive welding operations. For example, a part of the weld 74 may be deposited to unite the lamina 80 with the head 46 and then the remainder of this weld formed to unite the lamina 82 with the head. Similarly, the laminae 84 and 86 may be united with the next outer step of the head and then the outermost laminae 88 and 90 joined with the head by successive deposits of parts of the weld 78.

This application is a division of the parent case Serial No. 373,560 filed January 8, 1941.

I claim:

1. In a laminated shell pressure vessel, a solid unitary head having a circumferentially shouldered annular face with the shoulders stepped in line or in the same direction, the laminated shell section of the vessel including a plurality of interfitting and concentric shells in the form of hollow cylinders with the end of an inner shell in stepped relation to the corresponding end of the next shell, and means stepped in the same direction joining the head and the shells, said means including separated and stepped circumferential welds.

2. In a laminated shell pressure vessel; circumferentially shouldered ends with the shoulders presenting weld annuli stepped in line; the laminated shell section of the vessel including an inner shell welded to said heads with its outside surface substantially aligned with corresponding inner steps on the heads, a second shell fitting tightly over the inner shell and having its ends in stepped relationship to the ends of the inner shell, filler rings covering the welds joining the heads and the inner shell and interposed relative to the heads and the ends of the second shell and spaced therefrom for welds, and circumferential welds stepped in line and joining the filler rings to the heads and the second shell.

3. In a pressure vessel, a preformed laminated shell in the form of a hollow cylinder, solid and unitary forged steel heads having axially and radially offset circumferential weld annuli in registration with the laminae of the shell and stepped in line weld covering rings interposed with reference to the ends of the outer laminae and aligned stepped portions of the heads, welds joining the laminae to the filler rings, and other welds joining the filler rings and the heads.

4. In a pressure vessel having a laminated cylindrical shell section, a solid and unitary head having an annular shell joining portion formed with a plurality of axially and radially offset weld annuli stepped in line, a plurality of interfitting shells in the form of a hollow laminated cylinder with the end of an inner shell in stepped relation to the corresponding end of the next shell, and separated and stepped circumferential welds each joining the head and one of the shells, the inner of said interfitting shells being of substantially the same thickness as the inner weld annulus to which it is welded in end to end relationship.

5. In a pressure vessel having a laminated shell section, a stepped and solid unitary head, said shell section including a plurality of interfitting and concentric shells in the form of hollow cylinders with the end of an inner shell in stepped relation to the corresponding end of the next shell, and means joining the head and shells, said means including separated and circumferential welds stepped in line.

6. In a pressure vessel having a laminated shell section, said laminated shell section including a plurality of concentric shells of different lengths arranged contiguously and presenting an annular section an end of which is shouldered or stepped to provide separated weld portions, a solid unitary head having annular weld portions stepped in line and corresponding with the weld portions of said annular section, and means including separated and non-contiguous annular welds joining the corresponding weld portions of the bands and the head.

JOHN C. GRUBB.